Patented Aug. 21, 1934

1,971,323

UNITED STATES PATENT OFFICE 1,971,323

FOOD COMPOUND AND METHOD OF PREPARING SAME

Charles M. Strasburger, Baltimore, Md., assignor to Prepared Seafoods Corporation, a corporation of Maryland No Drawing. Application December 11, 1930, Serial No. 501,750

5 Claims. (Cl. 99—8)

This invention relates to improvements in food compounds and embodies a novel product and the process of preparing same.

More particularly, the invention has for its object the production of a cooked food preparation packed in a fatty substance and sterilized, to be sold in appropriate containers and to be consumed at some later date.

A further object of the invention is to produce a cooked food article, preserved in a fatty substance, so as to retain the natural flavor, odor, color, taste, and moisture within the food and to maintain the food in an uninjured condition for ultimate consumption.

Another object of the invention is to use a fatty substance for surrounding a cooked food product so as to form a unit therewith, and by forming a protective film between the comestible and the container, obviating the need of a specially treated container.

Heretofore in the preserving of foods of the nature contemplated by the present invention, serious difficulties have been encountered and costly processes had to be used. In the preserving of sea food, more particularly crabs, lobsters and shell fish, in cans, it was considered necessary to use a liner of some insulating material or a coating of enamel. Or alternatively chemicals were added to prevent discoloration of the can and the preserved product. This discoloration is caused largely by the presence of hydrogen sulphide from the food which attacks the metal of the container setting up a reaction therewith, resulting in a discolored unsightly product which not only is unsaleable but is often unfit as food.

The packing of foods in oil is a well known expedient, but is open to many objections. The product, if loosely packed in oil, is subject to jostling and rubbing against the container walls, often resulting in breaking the product into bits. If the product is tightly packed, which is usually the case, there is also a tendency to break the individual food units, particularly if they are crisp. Then too, oil will infiltrate into the pores of the food and carry off some of the essence of the food imparting instead the taste and odor of the oil.

It has been proposed in the past to preserve cooked foods in an absorbing medium such as potatoes. This expedient has been found however to destroy the original taste, flavor, moisture content, and tenderness of the foods due to absorption by the potatoes. It is largely these factors as explained, that have contributed in the past to failures to produce a satisfactory preserved cooked food product.

My invention overcomes these difficulties and failures by means of a process which will now be described. According to the present invention there is provided a quickly solidifying fat about the food so as to prevent ingress or egress of any flavor, moisture or aroma, into or from the food.

The present invention is directed to the preserving of cooked foods whether they be steamed, boiled, broiled, baked, roasted or fried, packed in any container whatsoever be it paper, treated or not, glass or metal, designed to be opened, hermetically sealed or merely closed without sealing. It is not restricted to any particular genus or species of food, but for examples I suggest fried oysters, broiled lobster, fried soft crabs, fried, baked or roasted meats, poultry, fish, fish cakes or vegetables.

In order that this invention may be fully understood I will describe it in detail with reference to the preparation of a fried oyster product. This is given merely as a typical illustration of my process and product.

The oysters to be preserved are shucked, sorted and drained, as is customary, and are padded as ordinarily done in the culinary art. The padding material may be cracker dust or meal, bread crumbs, flour, batter, etc., and may be applied one or several times to produce the desired condition preparatory to frying. At some point during the padding, either before the first layer is applied, or preceding any particular layer the oyster may be dipped into an albuminous or gelatinous substance to provide a coagulating adhecive for retaining the padding in position and at the same time imparting to the padding a delectable taste. This coagulating may be in the form of egg, fresh, powdered, or frozen, gelatine, or any edible animal or vegetable adhesive.

The padded oysters are now lowered into a hot fat, the fat having been already brought to a frying temperature. Any fat whatsoever may be employed for this frying step, such as oil or grease of either animal or vegetable origin, or a combination of the two. Whereas any frying temperature desired may be employed, it is found as the result of experimentation with various temperatures that 400° F. or higher gives a superior product, due to the fact that fat at a lower temperature will tend to remove the natural juices and moisture from the oyster, and the fat itself will seep into the padding. On the other hand a fat at the higher temperature besides sterilizing the oysters will instantaneously produce an impervious shell or layer of padding, preventing either absorption by the padding or escape of desirable properties therefrom. Hence the use of a quick frying temperature for the fat (400° F. or more) brings about the formation of a crisp outside crust and prevents sogginess of the fried oyster by excluding grease, yet retains the natural properties within the crust. It is preferable to use a stable, saturated fat for the frying such as produced by a hydrogenation process, in order to guard against subsequent rancidity of the product.

After the frying has continued to an extent to give the oysters the desired appearance and degree of cooking, they are removed from the frying grease, and placed in desired numbers in a suitable container. The container may be a paper carton, a glass jar, a can, or may assume any other form. The container is now filled with a hot grease or fat, preferably of a stable and saturated nature, so as to fill the spaces between the individual oysters themselves, and also the spaces between the oysters and the container. The filling fat may be the same in which the oysters are fried, but it is preferable to employ an unused, clean fat that solidifies at about 115° F. or higher, so as to retain its solidity under the most severe atmospheric conditions. This filling fat is preferably added as a liquid at a high temperature so that in the event of subsequent sealing, complete displacement of air combined with later contraction of the fat will occasion the securing of a high degree of vacuum within the container, thus setting up a further safeguard against rancidity and/or oxidation of the product. The preferred embodiment of this invention contemplates hermetic sealing of the container, but it is desired not to limit the scope of the invention thereto.

After the container is hermetically sealed the filled container may be subjected to a sterilization treatment at a suitable temperature over a suitable period of time, for example 250° F. for fifteen minutes. If this step be included, it provides a second sterilization for the oysters. The relatively high specific heat of the filling fat and its ready liquefaction provides a quick heat penetration for sterilization.

The container with its contents is next subjected to a sudden cooling to quickly solidify and harden the fat. This solidification is brought about rapidly so as to prevent the fat from being absorbed by the padding and also to seal the natural moisture and other desirable properties, well within the oyster to prevent breaking down and loss of flavor. The solidifying and hardening of the fat also serves to hold the oysters firmly in a fixed position, thereby preventing damage to the crisp outside shell or padding.

The filling fat has a further function, namely, as the preheating medium, preparatory to serving the fried oysters. To serve the product it is desirable to place the can over a small flame to melt the fat adhering to the can walls and to then transfer the contents to a frying pan, or the like, and melt the fat over a fire, whereupon the oysters are ready to be served.

The use of a solidified fat protects the oysters from any reaction with the walls of the container, inasmuch as a protective film of the fat completely insulates the oysters from the container. This factor derives its importance from the fact that no special liner or coating is required for the can, nor is any chemical required to postpone or eliminate such contingency.

As set out before, hermetically sealing and processing the product are desirable steps in the process, the product is thereby kept permanently sterile and is preserved in its original appearance, crispness, tenderness and flavor, and at the same time rancidity of the fat and oxidation and autolysis of the product are prevented.

It will be understood that various other products may be preserved in the same manner regardless of whether a padding is used or not, for example broiled lobster in butter sauce. Further it is within the scope of this invention to carry on the frying or other cooking of the product in its ultimate container. It will be further understood that the invention is not restricted to the various products, temperatures, or times exemplified, except as covered by the appended claims.

I claim:

1. The process of preserving food comprising cooking the food until it is ready for consumption, placing it in a container and entirely covering it with saturated, hot, liquid edible fat having a melting point in excess of 115° F., hermetically sealing the container and preventing the penetration of the fat into the food by sudden cooling.

2. The process of preserving food comprising cooking the food until it is ready for consumption, placing it in a container and entirely covering it with saturated, hot, liquid edible fat, hermetically sealing the container, preventing the penetration of the fat into the food by sudden cooling, and maintaining the fat in solid condition.

3. The process of preserving food comprising cooking the food until it is ready for consumption, placing it in a container and entirely covering it with saturated, hot, liquid edible fat having a melting point in excess of atmospheric temperatures usually encountered by preserved foods, hermetically sealing the container and preventing the penetration of the fat into the food by sudden cooling.

4. The process of preserving food comprising cooking the food until it is ready for consumption, placing it in a container and entirely covering it with saturated, hot, liquid edible fat having a melting point of about 115° F., hermetically sealing the container and preventing the penetration of the fat into the food by sudden cooling.

5. A cooked food product ready for consumption, packed within an hermetically sealed container, with a surrounding body of saturated, edible solidified fat remaining solid under atmospheric temperatures of about 115° F., said fat not permeating the food product itself.

CHARLES M. STRASBURGER.